F. L. SMITH.
AUTOMATIC FOOT THROTTLE FOR MOTOR VEHICLES.
APPLICATION FILED JULY 28, 1914.
1,161,898.　　　　　　　　　　　Patented Nov. 30, 1915.
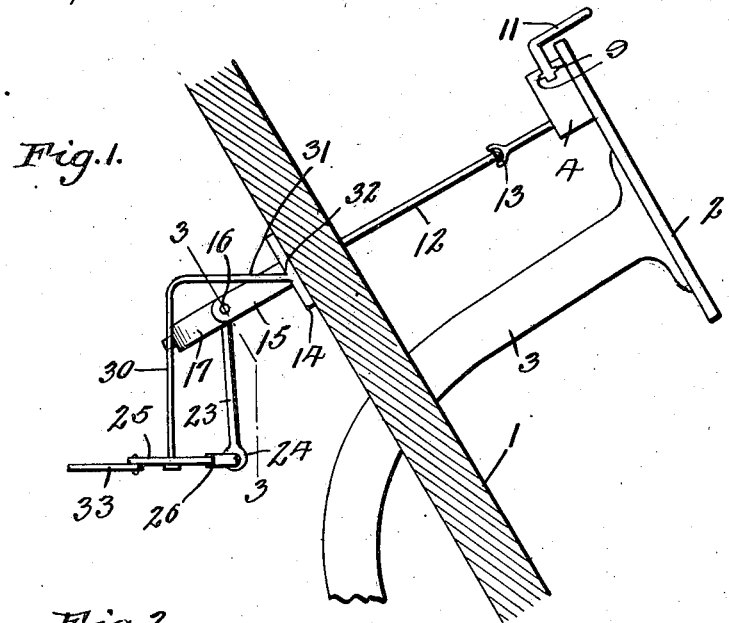
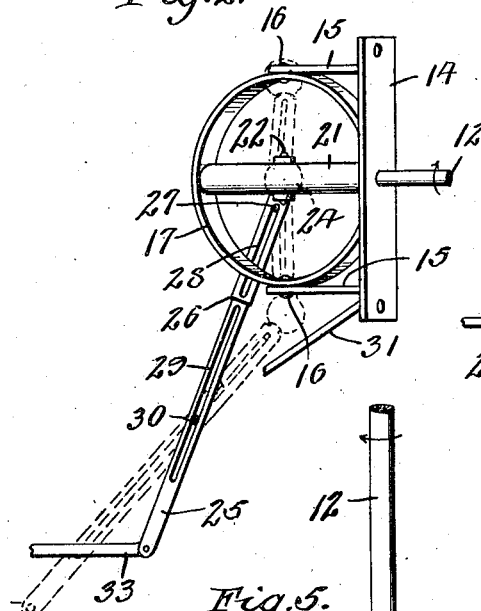
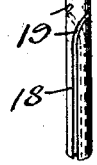
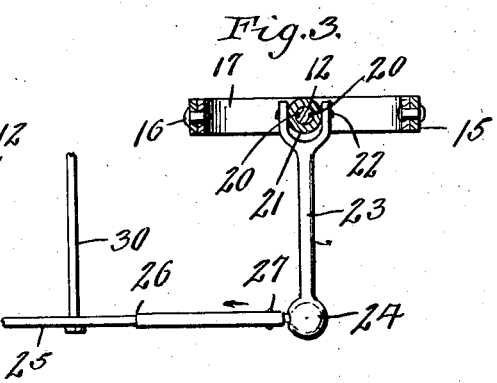
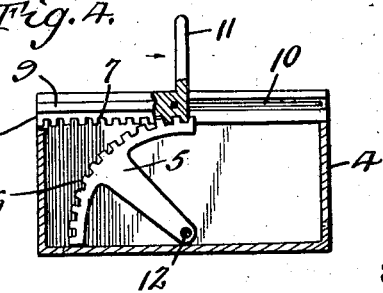
Inventor
F. L. Smith,
By Victor J. Evans
Attorney

UNITED STATES PATENT OFFICE.

FRANK L. SMITH, OF CHICAGO, ILLINOIS.

AUTOMATIC FOOT-THROTTLE FOR MOTOR-VEHICLES.

1,161,898.  Specification of Letters Patent.  Patented Nov. 30, 1915.

Application filed July 28, 1914. Serial No. 853,758.

*To all whom it may concern:*

Be it known that I, FRANK L. SMITH, a citizen of the United States, residing at Chicago, in the county of Cook and State of Illinois, have invented new and useful Improvements in Automatic Foot-Throttles for Motor-Vehicles, of which the following is a specification.

This invention relates to automatic foot throttles for motor vehicles, the main object of the invention being to provide in combination with the brake pedal of a motor vehicle, means actuated by said pedal operating to throttle the engine simultaneously with the application of the brake.

A further object of the invention is to provide in connection with such means, other means on the brake pedal for adjusting the throttle while the pedal is at rest in brake releasing position.

A further object of the invention is to provide means of the character above referred to which may be easily applied to the brake pedals of machines now in use as well as to machines during the process of manufacture.

With the above and other objects in view, the invention consists in the novel construction, combination and arrangement of parts, as will be hereinafter more fully described, illustrated and claimed.

In the accompanying drawings, Figure 1 is a side elevation of the automatic throttle mechanism of this invention shown applied to the brake pedal of a motor vehicle, the floor and adjacent parts of said vehicle being shown in longitudinal section. Fig. 2 is a sectional plan view of that part of the mechanism which is located below the vehicle floor. Fig. 3 is a section on the line 3—3 of Fig. 1. Fig. 4 is a section, taken longitudinally of the combined housing and guide. Fig. 5 is a detail perspective view of the lower end portion of the pedal actuated shaft.

Referring to the drawings 1 designates the floor of a motor vehicle, 2 the brake pedal and 3 the brake lever which carries the pedal 2 on its upper end, said parts being of the usual construction and arrangement now found in motor vehicles.

In carrying out the present invention, the pedal 2 is made of longer dimensions in a fore and aft direction sufficient to receive both the heel and ball of the foot of the operator so that he may swing his foot on the heel as a center in order to adjust the throttle controlling means to be hereinafter particularly described.

In the preferred embodiment of this invention, a combined housing and guide 4 is fastened in any convenient way to the bottom of the pedal 2 as shown in Fig. 1 and within said housing is arranged a sector 5 the teeth 6 of which are engaged by the teeth 7 of a horizontally slidable rack bar 8 having oppositely extending ribs or tongues 9 which are received in corresponding grooves 10 in the combined housing and guide 4 as shown in Figs. 1 and 3. The rack bar 8 is provided with an upwardly projecting toe-piece 11 against which the operator may press his foot in order to shift the toe-piece 11 across the upper edge of the pedal 2, the rack bar 8 which is fixedly connected with the toe-piece 11 operating in conjunction with the sector 5 to partially rotate a pedal actuated shaft 12 which extends from the lower face of the pedal 2 downwardly through an opening in the floor 1 of the vehicle, said shaft 12 being provided with a universal joint 13 to allow for the bending of said shaft when the brake pedal is depressed.

14 designates a bracket secured to the bottom of the floor 1 and provided with arms 15 in spaced relation to each other between which is pivotally mounted at 16 a ring 17 provided with diametrically opposite openings through which the shaft 12 is slidable in the direction of its length, the pivotal connection 16 permitting said ring 17 to tilt to conform to the angle of the shaft 12 when the latter is depressed by the brake pedal.

The shaft 12 is provided as to its lower end portion with grooves 18 extending longitudinally thereof as shown in Fig. 5 and terminating at their upper ends are spiral portions 19 the purpose of which will hereinafter appear. The grooves 18 and 19 receive tongues 20 on the inside of a collar 21 which has pivotally connected thereto at 22 a lever shifting arm 23 having a ball and socket connection at 24 with a throttle lever 25, said lever 25 also having a slide joint connection at 26 with the lever shifting arm 23 to allow for a certain amount of movement of said arm 23 without affecting or moving the throttle lever 25. The slide joint 26 is shown as consisting of a pin 27 carried by a member of the ball and socket joint 24, which pin is adapted to slide back and forth in a slot 28 in the sleeve-like end portion of the throttle lever 25.

The throttle lever 25 is formed with a longitudinal slot 29 in which is received a fulcrum post 30 on the end of a fulcrum post bracket 31 having an attaching portion 32 fastened in any suitable manner to the floor 1 of the vehicle, the fulcrum post 30 being therefore stationary while the lever 25 is adapted to slide in the direction of its length on said fulcrum and simultaneously swing on said fulcrum as indicated by the full and dotted lines in Fig. 2. From the extremity of the throttle lever 25, a suitable connection 33 such as a push rod extends to the throttle valve of the usual carbureter of the engine.

The operation of the automatic throttling mechanism hereinabove described and illustrated in the drawings is as follows. When the operator depresses the brake pedal 2 and applies the brake, the shaft 12 is simultaneously depressed, being moved in the direction of its length. This causes the shaft 12 to slide through the collar 21 until the tongues 20 are engaged by the spiral portions 19 of the slots 18. When this takes place, the collar 21 is partially turned and this causes the arm 23 to swing to one side and move the throttle lever 25 from the full line position of Fig. 2 to the dotted line position in the same figure. As a result of this, the throttle of the carbureter is closed and therefore the engine is throttled down simultaneously with the application of the brake.

In addition to the operation above referred to, by pressing the toe-piece 11 to one side, a partial rotation is given to the shaft 12 without moving the latter in the direction of its length and without causing the spiral portions 19 of the slots 18 to act with a turning effect on the arm 23. Instead of this, the arm 23 is turned to one side to an extent proportionate to the movement of the toe-piece 11. This enables the operator to adjust the speed of his motor in accordance with the traffic regulations and in accordance with the exigencies in any particular case. For example, if he is backing into a garage among other machines, he may adjust the toe-piece 11 to produce the requisite throttling of the engine and thereafter when he applies the brake, the engine will be automatically throttled down by the action of the spiral portions 19 of the grooves 18. The mechanism as a whole is productive of ease in driving, a thorough bracing of the heel and ball of the foot and also results in the ability of the operator to adjust the throttle to any desired point and maintain said adjustment regardless of road conditions. The mechanism adds greatly to the safety of the machine as the foot may always remain on the brake and a quick stop and throttling of the engine may be effected. Furthermore, by means of the device hereinabove described, gear shifting may be effected with a minimum amount of noise and trouble and the engine will be prevented from racing thereby adding to the life and durability of the motor. In cold weather the use of a lap robe will not interfere with the automatic throttling mechanism. Furthermore, the mechanism as a whole is inexpensive to manufacture and may be readily applied to any machine.

What I claim is:—

1. The combination with the brake pedal of a motor vehicle, of means actuated by said pedal operating to throttle the engine simultaneously with the application of the brake, said means comprising a throttle lever, a fulcrum on which said lever is slidable, a lever shifting arm, and a longitudinally movable shaft actuated by said brake pedal and operating to swing said lever shifting arm.

2. The combination with the brake pedal of a motor vehicle, of means actuated by said pedal operating to throttle the engine simultaneously with the application of the brake, said means comprising a throttle lever, a fulcrum on which said lever is slidable, a lever shifting arm, and a longitudinally movable shaft actuated by said brake pedal and having a spiral tongue and groove engagement with said lever shifting arm whereby the latter is caused to swing when the brake pedal is depressed.

In testimony whereof I affix my signature in presence of two witnesses.

FRANK L. SMITH.

Witnesses:
J. W. HIESTAND,
H. J. LUND.